United States Patent
Hosoya et al.

(10) Patent No.: US 8,696,901 B2
(45) Date of Patent: Apr. 15, 2014

(54) POROUS POLYMER AND PROCESS FOR PRODUCING THE SAME

(75) Inventors: Ken Hosoya, Kyoto (JP); Hiroshi Aoki, Kyoto (JP); Norio Ishizuka, Kyoto (JP); Katsuya Yamamoto, Kobe (JP)

(73) Assignees: National University Corporation Kyoto Institute of Technology, Kyoto (JP); Emaus Kyoto, Inc., Kyoto (JP)

( * ) Notice: Subject to any disclaimer, the term of this patent is extended or adjusted under 35 U.S.C. 154(b) by 678 days.

(21) Appl. No.: 11/915,302

(22) PCT Filed: May 9, 2006

(86) PCT No.: PCT/JP2006/309313
§ 371 (c)(1),
(2), (4) Date: Nov. 21, 2007

(87) PCT Pub. No.: WO2006/126387
PCT Pub. Date: Nov. 30, 2006

(65) Prior Publication Data
US 2009/0045119 A1    Feb. 19, 2009

(30) Foreign Application Priority Data
May 24, 2005    (JP) .................................. 2005-151077

(51) Int. Cl.
*B01D 15/08*    (2006.01)
*B01J 20/28*    (2006.01)
*B01J 20/30*    (2006.01)
*G01N 30/02*    (2006.01)
*B01D 15/38*    (2006.01)

(52) U.S. Cl.
CPC .......... *B01J 20/28092* (2013.01); *B01J 20/305* (2013.01); *B01J 20/28054* (2013.01); *B01D 15/3842* (2013.01)
USPC .......... 210/198.2; 210/656; 422/70; 73/61.52

(58) Field of Classification Search
USPC .................. 210/198.2, 656; 422/70; 73/61.52
See application file for complete search history.

(56) References Cited

U.S. PATENT DOCUMENTS 5,728,457 A * 3/1998 Frechet et al. ............. 210/198.2
6,420,441 B1    7/2002 Allen et al.

FOREIGN PATENT DOCUMENTS

EP    0 135 292 A1    3/1985
JP    60-58401 A    4/1985
(Continued)

OTHER PUBLICATIONS

Nakanishi, Kazuki. Pore structure control of silica gels base on phase separation. Journal of Porous Materials. vol. 4 (1997) p. 67-112.*

(Continued)

*Primary Examiner* — Katherine Zalasky
(74) *Attorney, Agent, or Firm* — Leydig, Voit & Mayer, Ltd.

(57) ABSTRACT

The present invention relates to a polymeric porous material characterized in that: the porous material has a bimodal pore size distribution attributable to macropores having a pore size of at least 50 nm and mesopores having a pore size of from 2 nm to less than 50 nm, the proportion of the specific surface area of the macropores to the specific surface area of all pores of the porous material is at least 10%, and the porous material is produced by (1) polymerizing a monomer in the presence of a polymerization initiator using as a porogen a solution obtained by dissolving a polymer having a weight-average molecular weight of at least 100,000 and a molecular weight distribution Mw/Mn of not more than 1.5 in a good solvent for the monomer, and (2) removing the porogen from the resultant product.

19 Claims, 7 Drawing Sheets

(56) References Cited

FOREIGN PATENT DOCUMENTS

| JP | 06-228205 A | 8/1994 |
|---|---|---|
| JP | 11-271294 A | 5/1999 |
| JP | 3168006 B2 | 3/2001 |
| JP | 2001-210142 A | 8/2001 |
| JP | 2004-055165 A | 2/2004 |
| JP | 2004-190014 A | 7/2004 |
| WO | WO 93/07945 A1 | 4/1993 |

OTHER PUBLICATIONS

Tanaka et al., *Physical Review Letters*, 76(5): 787-790 (Jan. 29, 1996).
Aoki et al., *Journal of Chromatography A*, 1119: 66-79 (2006).
Peters et al., *Analytical Chemistry*, 69(17): 3646-3649 (Sep. 1, 1997).
Peters et al., *Analytical Chemistry*, 70(11): 2288-2295 (Jun. 1, 1998).
Svec, *Journal of Separation Science*, 27: 747-766 (2004).
Tanaka et al., *Journal of Chromatography A*, 965: 35-49 (2002).
Ueki et al., *Analytical Chemistry*, 76(23): 7007-7012 (Dec. 1, 2004).
Ishikuza et al., *Analytical Chemistry*, 72: 1275-1280 (2000).
Hashimoto et al., *Macromol. Symp.*, 190: 9-22 (2002).
Hirokawa et al., *Macromolecules*, 41: 8210-8219 (2008).
Kreyszig, E., "Second Fundamental Form—Gaussian and Mean Curvature of a Surface" in *Differential Geometry* (Dover Publication, New York, 1991), Chapter 3, pp. 124-128.
Safrany et al., *Polymer*, 46: 2862-2871 (2005).
Tsai et al., *Macromolecules*, 23: 775-784 (1990).
Hirokawa et al., *Macromolecules*, 32: 7093-7099 (1999).
Kanamori et al., *Colloids and Surfaces A: Physicochem. Eng. Aspects*, 241: 215-224 (2004).
Demyanchuk et al., *Journal of Chemical Physics*, 121(2): 1141-1147 (2004).
Yang et al., *Colloid Polym. Sci.*, 277: 446-451 (1999).
Aoki et al., *Polymer Chemistry*, 44: 949-958 (2006).
Gusev et al., *Journal of Chromatography A*, 855: 273-290 (1999).
Ivanov et al., *Anal. Chem.*, 75: 5306-5316 (2003).
Pucci et al., *Journal of Separation Science*, 27: 779-788 (2004).
Schweitz et al., *Analytical Chemistry*, 69: 1179-1183 (1997).
Sykora et al., *Macromolecular Material and Engineering*, 275: 42-47 (2000).
Xie et al., *Journal of Polymer Science*, 35: 1013-1021 (1997).

\* cited by examiner

Thermal Polymerization        Photopolymerization

POROUS POLYMER AND PROCESS FOR PRODUCING THE SAME

TECHNICAL FIELD

The present application was filed claiming the priority of Japanese Patent Application No. 2005-151077, the entire content of which is herein incorporated by reference.

The present invention relates to a polymeric porous material useful as a polymeric separation medium for filling a liquid chromatography column and the like.

BACKGROUND ART

Conventionally, methods comprising polymerizing a crosslinkable monomer in situ in a column with a poor solvent as a porogen (pore-forming agent) have been predominantly used for preparing a polymer-based monolithic separation medium for liquid chromatography. For example, Patent Literature 1 describes a process for producing a liquid chromatography column containing a polymer having pores having a diameter of less than 200 nm and pores having a diameter of not less than 600 nm, which comprises reacting a polymerization mixture containing a hydrophobic vinyl monomer, a radical initiator, and a poor solvent for the vinyl monomer as a porogen, and then, removing the porogen.

However, polymer molecules evolved from a monomer tend to be aggregated in a poor solvent, since the effect of van der Waals forces between the polymer molecules is greater than the steric hindrance effect. In such a system, the formation of monolithic medium progresses through the following steps: (1) the nuclear formation by the entanglement of polymer chains evolved from a monomer; (2) the drastic increase of surface energy of the system by increasing the amount of dispersed fine microgel particles; (3) the decrease of surface energy and the phase separation by the agglomeration of microgel particles; and (4) the emergence of rapidly coarsened particle-agglomerated structure. Thus, the phase separation of the polymer phase and the poor solvent phase (porogen) extremely rapidly progresses. In such a system, a monolith comprising a nonuniform macroporous coarse particle aggregate is obtained. There are some problems with such an aggregate that the separation efficiency becomes lower, because the aggregate has a labyrinth of macro through-pore channels, and the eddy diffusion of solute becomes higher; the aggregate is mechanically fragile, and the morphological stability thereof is as low as a change in porosity due to a compressive effect is caused when a column filled with the aggregate is subjected to a high back pressure; the separation capacity of solute becomes lower, because the aggregate has a small amount of mesopores having a nanometer diameter and a extremely low specific surface area of pores; and the like.

In the meantime, as a result of a rapid progress in recent research on the phase separation of polymer solutions, it has been found that the viscoelasticity of polymer solutions greatly affects the phase separation speed (Non-patent Literature 1). In general, when a solution of low molecular weight substance is subjected to a rapid temperature change (rapid cooling or rapid heating) into an unstable area where two phases are coexisted, the spinodal decomposition is rapidly caused. As a result, eventually, the system is dominated by a surface tension and the solution is separated into two phases in sea-island structure composed of a dispersion phase containing the solute (small amount component) and a matrix phase containing the solvent (large amount component). However, in the case of polymer solutions, when there is a great difference in molecular dynamics (i.e., mobility) between a solvent molecule and a polymer, a viscoelasticity and a stress having a long relaxation time are caused because of a rapid gelation of the polymer rich phase due to the desolvation. As a result, the diffusion of the solvent molecules from the polymer rich phase is temporarily inhibited. Thus, a conventional two phase separation of the system is not caused immediately by a rapid temperature change, but a transitional three-dimensional continuous network structure having a long relaxation time is formed in the polymer rich phase. For example, in a system containing a polystyrene having a glass transition temperature of 100° C. as a small amount component and a polyvinyl ether having a glass transition temperature of −23° C. as a large amount component, wherein the component molecules have a different mobility, the formation of a transitional three-dimensional continuous network structure of polystyrene phase is observed in the course of the phase separation when a temperature of the system is rapidly changed from a room temperature to 143° C. (Non-patent Literature 2).

Patent Literature 1: JP-B-3168006

Non-patent Literature 1: Kobunshi, Vol. 52, No. 8, page 572 (2003)

Non-patent Literature 2: Physical Review Letters, Vol. 76, page 787 (1996)

DISCLOSURE OF INVENTION

Problems to be Solved by the Invention

The object of the present invention is to provide a polymeric porous material having a uniform structure, regular pores and a permeability suitable for flowing a mobile phase, which can show a superior separation capacity when it is used as a polymeric separation medium filled in a liquid chromatography column.

Means for Solving the Problems

In order to solve the above-mentioned problem, the present inventors have carried out various tests and found that a transitional continuous structure of polymer can be formed due to the characteristic viscoelastic effect of polymer solution on the phase separation. Furthermore, the present inventors have found that a polymeric porous material useful as a separation medium for monolithic high-performance liquid chromatography and the like can be obtained by polymerizing a monomer using a certain polymer solution as a porogen. As a result, the present invention is accomplished. The present invention includes the followings:

[1] A polymeric porous material characterized in that:

the porous material has a bimodal pore size distribution attributable to macropores having a pore size of at least 50 nm and mesopores having a pore size of from 2 nm to less than 50 nm, the proportion of the specific surface area of the macropores to the specific surface area of all pores of the porous material is at least 10%, and the porous material is produced by (1) polymerizing a monomer in the presence of a polymerization initiator using as a porogen a solution obtained by dissolving a polymer having a weight-average molecular weight of at least 100,000 and a molecular weight distribution Mw/Mn of not more than 1.5 in a good solvent for the monomer, and (2) removing the porogen from the resultant product.

[2] The polymeric porous material according to the above-mentioned [1], wherein the monomer comprises at least one crosslinkable monomer.

[3] The polymeric porous material according to the above-mentioned [1] or [2], wherein the good solvent for the monomer has an interaction parameter to the monomer of less than 0.5 at 25° C.

[4] The polymeric porous material according to any one of the above-mentioned [1] to [3], wherein the polymer has an interaction parameter to the good solvent for the monomer of less than 0.5 at 25° C.

[5] The polymeric porous material according to any one of the above-mentioned [1] to [4], wherein the porous material has a permeability of at least $10^{-15}$ m$^2$.

[6] A process for producing the polymeric porous material according to the above-mentioned [1], characterized in that it comprises the steps of:

(1) polymerizing a monomer in the presence of a polymerization initiator using as a porogen a solution obtained by dissolving a polymer having a weight-average molecular weight of at least 100,000 and a molecular weight distribution Mw/Mn of not more than 1.5 in a good solvent for the monomer, and (2) removing the porogen from the resultant product.

[7] A polymeric separation medium for filling a liquid chromatography column characterized in that it comprises the polymeric porous material according to any one of the above-mentioned [1] to [5].

[8] A liquid chromatography column filled with the separation medium according to the above-mentioned [7], characterized in that at least one part of the separation medium crosses the entire longitudinal cross-section.

Effect of the Invention

The polymeric porous material according to the present invention has a uniform structure, regular pores and a permeability suitable for flowing a mobile phase. Therefore, the polymeric porous material according to the present invention can show a superior separation capacity when it is used as a polymeric separation medium filled in a liquid chromatography column.

BEST MODE FOR CARRYING OUT THE INVENTION

Figure 1:
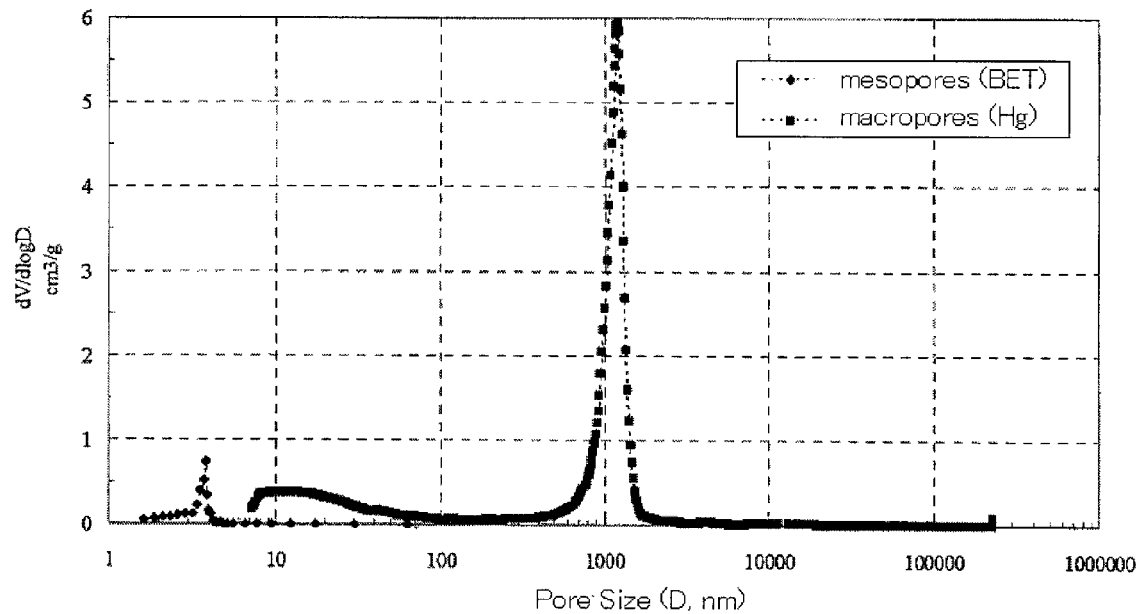
FIG. 1 shows the pore size distribution of the GDMA gel produced in Example 1.

The polymeric porous material according to the present invention has a bimodal pore size distribution attributable to macropores having a pore size of at least 50 nm and mesopores having a pore size of from 2 nm to less than 50 nm. For the purpose of obtaining an especially high separation efficiency and the like when the porous material is used as a polymeric separation medium filled in a liquid chromatography column, the pore size of macropores is preferably from 50 to 10,000 nm and particularly preferably from 500 to 5,000 nm, and the pore size of mesopores is preferably from 2 to 10 nm.

The proportion of the specific surface area of the macropores to the specific surface area of all pores of the porous material is at least 10%, preferably not less than 20% and not more than 95%, and particularly preferably not less than 40% and not more than 60%. When the proportion of the specific surface area of macropores is less than 10%, it is likely that a rapid separation cannot be obtained when the porous material is used as a polymeric separation medium filled in a liquid chromatography column, since the excess back pressure is caused during the flow of a mobile phase. In contrast, when the proportion exceeds 95%, it is likely that the separation efficiency is greatly reduced, since the porosity becomes higher, the through pore size becomes much larger, and the transportation path of materials in the mobile phase becomes longer, so that the material transportation becomes slower, and the amount of mesopores decreases. In particular, the theoretical plate number shows a strong rate-dependency, and therefore, increases with the increase in the rate of mobile phase, so that the decreasing effect on back pressure is countervailed. For example, such a phenomenon is reported for a silica monolith having an extremely large void size by Nobuo Tanaka et al. in Journal of Chromatogram A, 965 (2002), pages 35 to 49.

The pore size and the specific surface area of macropores in the present invention can be determined by a nitrogen adsorption and desorption method (BET method; ISO 9277:1995 "Determination of the specific surface area of solids by gas adsorption using the BET method").

The pore size and the specific surface area of mesopores in the present invention can be determined by a mercury intrusion method (ASTM D 4404-84 (2004), "Standard Test Method for Determination of Pore Volume and Pore Volume Distribution of Soil and Rock by Mercury Intrusion Porosimetry").

The proportion (%) of the specific surface area of macropores to the specific surface area of all pores in the present invention refers to a value calculated from the specific surface area (m$^2$/g) of macropores and the specific surface area (m$^2$/g) of mesopores, which are determined as described above, according to the formula (1):

[Formula 1]

$$\text{Proportion (\%) of specific surface area of macropores to specific surface area all pores} = \frac{\text{Specific surface area (m}^2\text{/g) of macropores}}{\text{Specific surface area (m}^2\text{/g) of mesopores} + \text{specific surface area (m}^2\text{/g) of macropores}} \times 100 \quad (1)$$

(Fiona S. Macintyre and David C. Sherrington, Polymers (2004), 37, page 7628-7636).

The permeability of the polymeric porous material according to the present invention is preferably not less than $10^{-15}$ $m^2$, more preferably not less than $10^{-15}$ $m^2$ and not more than $10^{-9}$ $m^2$, and particularly preferably not less than $10^{-14}$ $m^2$ and not more than $10^{-10}$ $m^2$. When the permeability is less than $10^{-15}$ $m^2$, it is likely that a rapid separation cannot be obtained when the porous material is used as a polymeric separation medium filled in a liquid chromatography column, since the back pressure becomes much higher with increasing the flow rate of mobile phase. In contrast, when the permeability exceeds $10^{-9}$ $m^2$, it is likely that some problems such as the reduction of the separation efficiency, the reduction in morphological strength, and the like will be raised, since the amount of macropores having a larger size increases, the medium has an almost hollow structure having a very high porosity, so that the transportation path for solute becomes longer and the material transportation becomes slower.

The permeability as used herein refers to a value calculated according to the Darcy formula (see "Seni Binran", 2nd edition (1994), 2.1 Structure and Properties of Fiber Assembly, page 267; and Dynamics of Chromatography Part 1, J. C. Giddings, page 205, Marcel Dekker (1965)) represented by the following formula (2):

[Formula 2]

$$Q/A = \kappa \Delta P/(\mu L) \quad (2)$$

[Q: flow rate ($m^3$/s) of cross section of medium, A: cross-sectional area ($m^2$) of medium, κ: permeability ($m^2$), ΔP: pressure loss (Pa), μ: fluid viscosity (Pa·s), L: medium length (m)].

The polymeric porous material according to the present invention is produced by (1) polymerizing a monomer in the presence of a polymerization initiator using as a porogen a solution obtained by dissolving a polymer having a weight-average molecular weight of at least 100,000 and a molecular weight distribution Mw/Mn of not more than 1.5 in a good solvent for the monomer, and (2) removing the porogen from the resultant product.

Namely, the polymeric porous material according to the present invention can be produced by using a certain polymer solution (polymer porogen). The principle of the process is considered as follows.

In the case of the polymerization reaction by using a polymer porogen, the mobility of a monomer is reduced, the aggregation of the monomers is inhibited, and the association of the polymer radicals is inhibited by the great viscosity effect of the polymer porogen. Therefore, the growth of regular linear polymers progresses in the initial stage of the polymerization. In addition, a stress against the bulk contraction due to the diffusion of a solvent from the polymer rich phase is increased by the viscoelastic effect due to the transitional gelation of the polymer rich phase. As a result, the formation of a uniform transitional three-dimensional continuous network structure is accelerated. Thus, the network structure is immobilized via the cross-link formation between the polymer molecules with the progression of the polymerization.

In addition, by using a polymer porogen, the phase separation is progressed in stages, and the formation of the macro through pores and the mesopores is independently progressed. The dissolved monodisperse polymer molecules form molecule clusters having a uniform size of several hundred nanometers in a good solvent, which are phase-separated from the polymer rich phase in the early stage and contribute the formation of macro through pores. In contrast, the good solvent molecules are subsequently phase-separated from the polymer rich phase by the viscoelastic effect of the polymer rich phase and contribute the formation of the mesopores.

Thus, the polymeric porous material according to the present invention having a uniform structure comprising a three-dimensional continuous network skeleton structure, a regular bimodal pore size distribution with sharp peaks located at a macropore area wherein the pore size is at least 50 nm and a mesopore area wherein the pore size is from 2 nm to less than 50 nm, and a permeability suitable for flowing a mobile phase is produced.

Namely, in the present invention, a polymeric porous material having a uniform structure, regular pores and a suitable permeability is obtained by controlling the phase separation by the viscoelastic effect of a polymer solution. In contrast, in the case of a poor solvent system wherein such viscoelastic effect of a polymer solution is not used for the phase separation, as described above, the phase separation rate is not controlled, so that a nonuniform particle aggregation structure is obtained.

The monomer used for the production of the polymeric porous material according to the present invention is not particularly limited, but preferably contains at least one crosslinkable monomer, in view of the morphological stability of the resultant polymeric porous material and the like. The "crosslinkable monomer" in the present invention refers to a monomer which is polymerizable and capable of forming an intermolecular cross-linking. The examples of the crosslinkable monomer include a polyvinyl monomer containing two or more vinyl groups (including acryloyl groups and methacryloyl groups) in a molecule, and the like.

The examples of the above-mentioned polyvinyl monomer include a divinylbenzene, a divinylpyridine, a dimethacrylate (e.g., a $C_{1-6}$ alkylene dimethacrylate such as ethylene dimethacrylate (EDMA); a hydroxy ($C_{1-6}$) alkylene dimethacrylate such as 1,6-hexanediol dimethacrylate (HDMA) and glycerol dimethacrylate (GDMA), etc.), a tri- or tetramethacrylate (e.g., trimethylolpropane triacetate, pentaerythritol tetraacetate), a bisacrylamide or methacrylamide (e.g., methylene bisacrylamide, piperazine diacrylamide) and the like, and preferably ethylene dimethacrylate (EDMA), 1,6-hexanediol dimethacrylate (HDMA), glycerol dimethacrylate (GDMA) and the like. Among them, glycerol dimethacrylate (GDMA) is particularly preferable, since the compound contains hydroxyl groups and has an advantage of a good interfacial adhesion to the inner wall of a silica column and the like. These may be used alone or in combination of two or more thereof.

The examples of the monomer to be used in the present invention, other than the above-mentioned crosslinkable monomer, include a monovinyl monomer containing one vinyl group (including acryloyl group and methacryloyl group) in a molecule, and the like.

The examples of the above-mentioned monovinyl monomer include styrene and a substituted styrene (e.g., a ring-substituted styrene which has a ring substituted with chloromethyl group, an alkyl group having 18 or less carbon atoms, hydroxyl group, t-butyloxycarbonyl group, a halogen atom, nitro group, amino group, a protected hydroxyl group, a protected amino group or the like), a methacrylate (e.g., a $C_1$ to $C_{12}$ alkyl-substituted methacrylate, methyl methacrylate, butyl methacrylate, glycidyl methacrylate), a vinylnaphthalene, an acrylate, vinyl acetate, a vinylpyrrolidone and the like. These may be used alone or in combination of two or more thereof.

The preferred monomer for the production of the polymeric porous material according to the present invention includes monomers containing at least one polyvinyl monomer, in particular, a polyvinyl monomer, and a mixture of a polyvinyl monomer and a monovinyl monomer (e.g., a mixture in a ratio of a polyvinyl monomer to a monovinyl monomer ranging from 100:0 to 10:90, preferably from 100:0 to 40:60).

The porogen used in the production of the polymeric porous material according to the present invention is a solution of a polymer having a weight-average molecular weight of at least 100,000 and a molecular weight distribution Mw/Mn of not more than 1.5 dissolved in a good solvent for the monomer. Namely, a solution of a monodisperse polymer having a high molecular weight is used as a porogen in the present invention.

The examples of the good solvent for the above-mentioned monomer include a solvent having an interaction parameter ($\chi$) to the monomer of less than 0.5 at 25° C., which is defined by the following formula (3):

[Formula 3]

$$\chi = V_1(\delta_1 - \delta_2)^2/RT + 0.34 \quad (3)$$

wherein
$V_1$: molar volume (ml/mol) of solvent
$\delta_1$: solubility parameter ($MPa^{1/2}$) of solvent
$\delta_2$: solubility parameter ($MPa^{1/2}$) of monomer
R: gas constant, 8.31451 $J \cdot mol^{-1} \cdot K^{-1}$
T: absolute temperature (K).

The interaction parameter is preferably not more than 0.4 and not less than 0.34 (theoretical minimum value according to the formula (3)) in view of the affinity of the monomer for the solvent.

The above-mentioned formula (3) wherein a monomer is ethylene dimethacrylate (EDMA) or glycerol dimethacrylate (GDMA) is described below for purposes of example.

The solubility parameter ($\delta_1$) of chlorobenzene is 19.4 $MPa^{1/2}$ and the molar volume ($V_1$) thereof is 101.717 ml/mol, whereas the $\delta_1$ of toluene is 18.2 $MPa^{1/2}$ and the $V_1$ thereof is 106.275 ml/mol. The solubility parameters of GDMA and EDMA are 20.5 and 19.6 $MPa^{1/2}$, respectively. Therefore, $\chi$ is about 0.37 in the case of GDMA/chlorobenzene, $\chi$ is about 0.57 in the case of GDMA/toluene, and $\chi$ is about 0.38 in the case of EDMA/chlorobenzene.

The definitions of the interaction parameter and the solubility parameter in the above-mentioned formula (3) (the below-mentioned Small's formula) are described in Polymer Handbook (4th edition), J. Brandrup et al., Wiley-Interscience, John Wiley & Son, 1999, chapter 7, page 688. The solubility parameter ($\delta_1$) of each solvent is obtained from the same reference and the like. The molar volume ($V_1$) of solvent is obtained from the parameters, i.e. the molecular weight (Mw) and the specific gravity (d), described in Essential Chemistry Dictionary, Reita Tamamushi et al., Tokyo Kagaku Dojin, 1999 and the like according to the following formula (4):

[Formula 4]

$$V_1 = Mw/d \quad (4)$$

The solubility parameter ($\delta_2$) of monomer is obtained as follows. For example, Mw is 227, d is 1.07 and the chemical formula thereof is $CH_2=C(CH_3)-OCO-CH_2CH(OH)CH_2-OCO-(CH_3)C=CH_2$ when the monomer is GDMA. The cohesive energy factor (F) of each functional group is given in the above-mentioned Polymer Handbook (4th edition), J. Brandrup et al., Wiley-Interscience, John Wiley & Son, 1999 and the like, as follows:
1) $CH_3-C=CH-$: 724 ($MPA^{1/2}$ $cm^3/mol$)
2) $-H$: 140
3) $-(C=O)-O-$: 634
4) $-CH_2-$: 272
5) $-OH$: 754
6) $-CH-$: 57

Therefore, the $\delta_2$ is obtained from the below-mentioned Small's formula (5):

[Formula 5]

$$\delta_2 = d\Sigma F/Mw \quad (5)$$

as $\delta_2 = 1.07 \times (724 \times 2 + 140 \times 2 + 634 \times 2 + 272 \times 2 + 754 + 57)/227 = 20.5$ $MPa^{1/2}$. The $\delta_2$ of EDMA is obtained in a similar way.

Therefore, the above-mentioned good solvent is appropriately selected, based on the monomer to be used and the above-mentioned formula (3), from a wide range of solvents, for example, an alkylbenzene (e.g., toluene, etc.), a halogen substituted benzene (e.g., a chlorobenzene, a dichlorobenzene, etc.), an alcohol (e.g., methanol, ethanol, polyethylene glycol, etc.) and mixtures thereof, ketone (e.g., acetone, tetrahydrofuran, etc.), ether and the like.

The weight-average molecular weight of the polymer used as the above-mentioned porogen is at least 100,000, preferably at least 500,000, and particularly preferably at least 1,000,000. In view of the easy agitation and the heat/light stability of the polymer, preference is given to less than 10,000,000, and particularly less than 9,000,000.

In view of the uniformity of structure and the regularity of pores, the molecular weight distribution Mw/Mn (weight-average molecular weight Mw/number-average molecular weight Mn) of the above-mentioned polymer is not more than 1.5, and preferably not more than 1.1.

The above-mentioned polymer is not particularly limited, as long as the polymer has the above-mentioned molecular weight and the above-mentioned molecular weight distribution and is dissoluble in the above-mentioned good solvent for monomer. Preference is given to a polymer having an interaction parameter (at 25° C.) to the good solvent for monomer, which is defined in the same manner as in the above-mentioned formula (3), of less than 0.5, and preferably not more than 0.4 and not less than 0.34. Such a polymer can be appropriately selected depending on a monomer and its good solvent. For example, the polymer can be specifically selected via a simple test such as a visual check of the polymer dispersivity by using a test tube. The examples of the polymer include vinyl type polymers such as a polystyrene, a polymer of an acryloyl group- or methacryloyl group-containing monomer (e.g., polymethylmethacrylate, etc.) and the like, preferably a polystyrene, and a polymethylmethacrylate.

The concentration of polymer in the above-mentioned solution to be used as a porogen is preferably 1 to 100 mg/ml, and particularly preferably 2 to 10 mg/ml, in view of the homogeneous dissolution.

The polymerization initiator used in the production of the polymeric porous material according to the present invention include common azo type or peroxide type radical polymerization initiators, such as 2,2'-azobisisobutyronitrile (AIBN), 2,2'-azobis(2,4-dimethyl)valeronitrile, benzyl peroxide and the like. Among them, 2,2'-azobisisobutyronitrile and 2,2'-azobis(2,4-dimethyl)valeronitrile are preferable. An initiator for living polymerization, photopolymerization and the like, such as 2,2,6,6-tetramethyl-1-piperidinyloxy, potassium t-butoxide, n-butyl lithium, benzophenone, a chlorothioxanthone, a dimethoxybenzophenone, a diethoxybenzophenone may be also used. As is well known, an azo type initiator such as AIBN can be used as a photopolymerization initiator.

In the production of the polymeric porous material according to the present invention, the volume ratio of the above-mentioned monomer and the above-mentioned porogen is generally not less than 10/90, and preferably from 20/80 to 50/50. When the ratio is less than 10/90, it is likely that the gelation becomes slower, the polymerization time becomes longer, and the resultant monolithic structure has high macroporousness and is mechanically fragile. When the ratio exceeds 50/50, it is likely that the effect of porogen is reduced, and the amount of macro through pores becomes insufficient.

The amount of the polymerization initiator used in the production of the polymeric porous material according to the present invention is not particularly limited as long as the polymerization reaction of the above-mentioned monomer is initiated, but is generally at least 1 mg or more, and preferably 5 mg to 20 mg, per 1 ml of the above-mentioned monomer.

The reaction condition of the above-mentioned polymerization reaction can be appropriately set, based on common conditions of radical polymerization reaction, photopolymerization reaction and the like, depending on a monomer to be used, a polymerization initiator to be used and the like. For example, the lower limit of the reaction temperature may be 0° C., preferably 30° C., more preferably 40° C., and particularly preferably 50° C., and the upper limit thereof may be 100° C., and preferably 70° C. The lower limit of the reaction time may be 1 hour, preferably 8 hours, and more preferably 12 hours, and the upper limit thereof may be 48 hours, and preferably 36 hours.

For example, in the case of the thermal polymerization reaction, the reaction temperature may be generally 40 to 100° C., and preferably 50 to 70° C., and the reaction time may be generally 8 to 48 hours, and preferably 12 to 36 hours.

In the case of the photopolymerization reaction, the reaction temperature may be generally 0 to 100° C., and preferably 30 to 70° C., and the reaction time (light irradiation time) may be generally 1 to 48 hours, and preferably 8 to 36 hours.

In general, an ultraviolet ray having a wavelength of from 100 to 400 nm, and preferably from 250 to 380 nm is used for the photopolymerization reaction. As a source of light, for example, a low-pressure mercury vapor lamp, a high-pressure mercury vapor lamp, a mercury-xenon lamp, a metal halide lamp and the like are used. The light intensity is generally within a range of from 500 to 3000 µW/cm$^2$, and preferably from 1000 to 2000 µW/cm$^2$ in the case of an ultraviolet ray having a wavelength of 250 to 380 nm.

The above-mentioned polymerization reaction can be carried out, for example, according to the following procedure.

First, a mixture is prepared by mixing the above-mentioned polymerization initiator and the above-mentioned monomer into a solution (porogen) obtained by dissolving the above-mentioned polymer into a good solvent for the monomer. Then, an oxygen is removed from the mixture optionally by bubbling with an inert gas (e.g., argon) and the like, and the polymerization reaction is carried out under a predetermined reaction condition.

The above-mentioned polymerization reaction can be carried out in a certain reaction container depending on a desired use. For example, when the polymeric porous material according to the present invention is used as a polymeric separation medium for filling a liquid chromatography column, a mixture containing a monomer, a porogen and an initiator can be filled in a predetermined column and carried out the polymerization reaction. The column can be selected from columns having any circular or rectangular cross-sectional shape or area and having a high stiffness such that the cross-section is not deformed, for example, a commercially available tube for a liquid chromatography column, such as a metallic tube, a quartz glass tube, a fused silica capillary, a fluoro plastic tube, a PEEK resin tube and the like. In particular, when the photopolymerization reaction is carried out, a column made of a UV transparent material (e.g., fused silica capillary) can be used. Specific examples thereof include a fused silica capillary having a circular cross-section having an internal diameter of not less than 10 µm and the like. In the case of a fused silica capillary, the modification of silanol groups of the inner wall of the column by a silane coupling agent and the like can be easily carried out for improving the interfacial adhesion of the inner wall of the column and a separation medium.

After completion of the above-mentioned polymerization reaction, the porogen (polymer and good solvent) is removed from the reaction product by washing with a suitable solvent to give the polymeric porous material according to the present invention. The solvent can be appropriately selected depending on the polymer and the good solvent used as a porogen. For example, when a polystyrene is used as a polymer and chlorobenzene is used as a good solvent, tetrahydrofuran (THF), methanol and the like can be used.

The polymeric porous material according to the present invention can be preferably used as a polymer-based monolithic separation medium for liquid chromatography, particularly a uniform polymer-based monolithic separation medium for filling a column, regardless of the cross-sectional shape of the column, the column shape, and the aspect ratio, i.e., the ratio of the diameter D and the length L of the column, L/D. In addition, the polymeric porous material according to the present invention can be used for a wide range of applications which require pores having a size ranging from nanometers to micrometers, including a separation carrier, a concentration carrier, an emulsification membrane, an electrode, an enzyme carrier, a catalyst carrier, a medium for filling a rectangular micro channel such as LC chip, and the like.

The present invention also provides a polymeric separation medium for filling a liquid chromatography column comprising the above-mentioned polymeric porous material, and a liquid chromatography column filled with the separation medium. In the column, at least one part of the separation medium crosses the entire longitudinal cross-section, i.e., the column is a monolithic column filled with a monolithic separation medium having a continuous structure. The separation medium and the column can be produced by the polymerization reaction using the above-mentioned column as a reaction container, as described above.

EXAMPLES

The present invention will be described in more detail below by way of Examples thereof, although the embodiments of the present invention are not limited to these Examples.

Each property in the following Examples was determined as follows:

1. Pore Size Distribution and Specific Surface Area of Macropores

The pore size and the specific surface area of macropores were determined by a nitrogen adsorption and desorption method (BET method; ISO 9277:1995 "Determination of the specific surface area of solids by gas adsorption using the BET method").

2. Pore Size Distribution and Specific Surface Area of Mesopores

The pore size and the specific surface area of mesopores were determined by a mercury intrusion method (ASTM D 4404-84 (2004) "Standard Test Method for Determination of Pore Volume and Pore Volume Distribution of Soil and Rock by Mercury Intrusion Porosimetry").

3. Permeability

The permeability was calculated from the Darcy formula represented by the formula (2):

[Formula 6]

$$Q/A = \kappa \Delta P/(\mu L) \quad (2)$$

[Q: flow rate ($m^3/s$) of cross section of medium, A: cross-sectional area ($m^2$) of medium, κ: permeability ($m^2$), ΔP: pressure loss (Pa), μ: fluid viscosity (Pa·s), L: medium length (m)].

The viscosities of two-phase mixed mobile phases, i.e., methanol/water (60/40, v/v) and acetonitrile/water (60/40, v/v), were cited from Introduction to Modern Liquid Chromatography, 2nd edition, and L. R. Snyder, J. J. Kirkland, page 838, Table II.3, John Wiley & Sons (1979).

Example 1

Into a test tube (internal diameter 10 mm, length 200 mm) was added 1.86 ml of a distilled chlorobenzene (χ about 0.37). Thereto was added 55.8 mg of a flake powder of ultra-high molecular weight polystyrene (Mw=3,840,000, Mw/Mn=1.04; Tosoh) at a room temperature. The mixture was gently agitated with a spatula to diffuse the polystyrene flake, and then the test tube was immersed in an ultrasonic agitation bath (Branson Ultrasonic Cleaner) for 10 minutes. After that, the test tube was let stand for 24 hours at a room temperature to give a transparent polymer porogen solution.

Next, 10 mg of 2,2'-azobisisobutyronitrile (Mw=164.21, 98%, Nacalai Tesque) was added to the polymer porogen solution, and dissolved in the solution by handshaking. Then, 1 ml of glycerol dimethacrylate (GDMA; KYOEISHA CHEMICAL, GP-101 P, molecular weight 227) was added to the solution to give a uniform transparent polymerization solution. After bubbling this polymerization solution with an argon gas for 10 minutes, the test tube was immediately sealed with a cap, and then immersed up to 90% of the tube length (about 180 mm) in a water bath controlled at 60° C. to carry out the polymerization for 24 hours.

After 24 hours, the test tube was filled up to a height of 4 cm from its bottom with an almost uniform white solid. Because the solid was completely adhered to the inner wall of the test tube, the test tube was placed into liquid nitrogen and smashed with a hammer to remove the solid piece. This solid piece was immersed in tetrahydrofuran (THF) for 24 hours. Then, the piece was air-dried at a room temperature and further dried at 60° C., and vacuumed for 1 hour to give a sample.

The mesopores having a pore size of from 2 nm to less than 50 nm and the macropores having a pore size of not less than 50 nm of this sample were measured by a nitrogen adsorption and desorption method (BET apparatus, Gemini II, MicroMetrics) and a mercury intrusion method (MicroMetrics), respectively. From the results, the proportion of the specific surface area of the macropores to the specific surface area of all pores (specific surface area ($m^2/g$) of macropores/(specific surface area ($m^2/g$) of mesopores+specific surface area ($m^2/g$) of macropores)×100(%)) was calculated. The results are shown in Table 1. The pore size distribution over an entire range of mesopores and macropores is shown in FIG. 1. A bimodal distribution with sharp peaks located at 4 nm in a mesopore range and located within a range from 1 to 2 μm in a macropore range was observed.

Example 2

Figure 2:
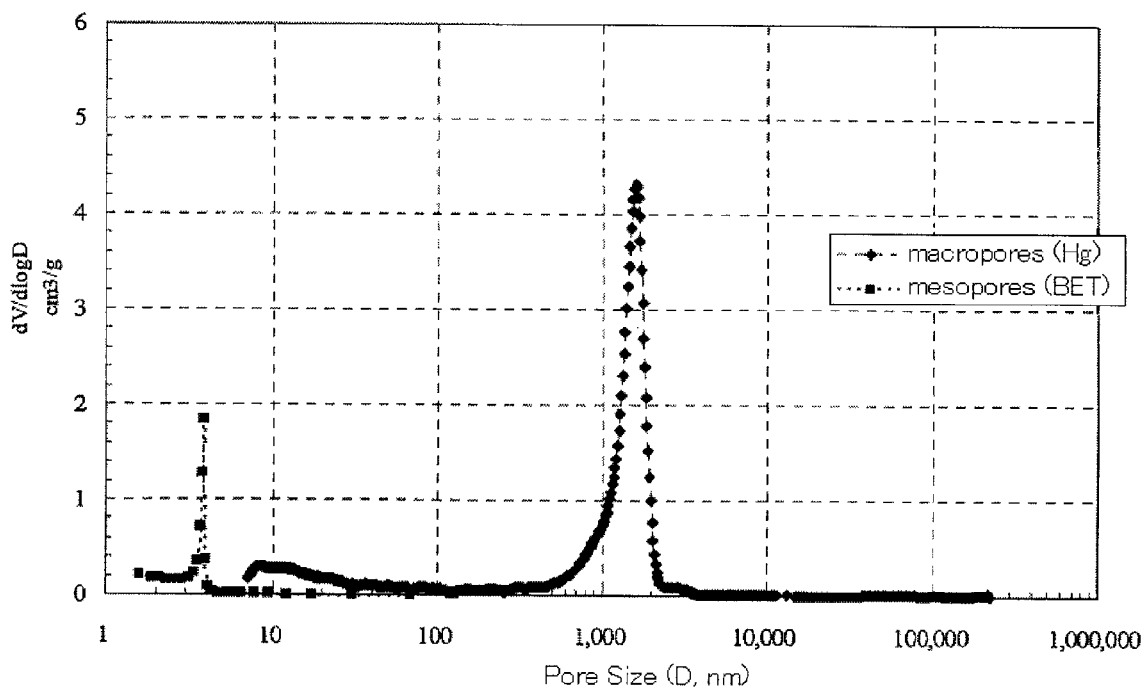
FIG. 2 shows the pore size distribution of the EDMA gel produced in Example 2.

The polymerization was carried out in the same manner as in Example 1 except that GDMA was changed to ethylene dimethacrylate (EDMA; χ about 0.36, KYOEISHA CHEMICAL, molecular weight 198, distilled at 64° C., 25 mmHg), 2,2'-azobisisobutyronitrile was changed to 2,2'-azobis(2,4-dimethyl)valeronitrile (Mw=248.37, 95%, WAKO chemicals). As a result, the test tube was filled up to a height of 4 cm from its bottom with a white solid. After drying the solid, the mesopores and the macropores of the dried sample were measured in the same manner as in Example 1. From the measurement results, the proportion of the specific surface area of the macropores to the specific surface area of all pores was calculated. The results are shown in Table 1. The pore size distribution is shown in FIG. 2. As in the case of Example 1, a bimodal distribution with sharp peaks located at 4 nm in a mesopore range and located within a range from 1 to 2 μm in a macropore range was observed.

Example 3

A polymerization solution of GDMA was prepared in the same manner as in Example 2 except that EDMA was changed to GDMA, and stored in a refrigerator. Then, a fused silica capillary coated with polyimide (internal diameter 200 μm) was cut as a coil having a length of about 180 cm, and 1 N aqueous NaOH solution was injected into the coil by a syringe. After sealing the both ends of the capillary coil, the coil was treated in a water bath at 60° C. for 1 hour. Then, the capillary coil was sequentially washed with excessive amounts of acetone and pure water in repeating fashion. The washed capillary coil was dried by a hot-air dryer at 160° C. for 24 hours.

Figure 3:
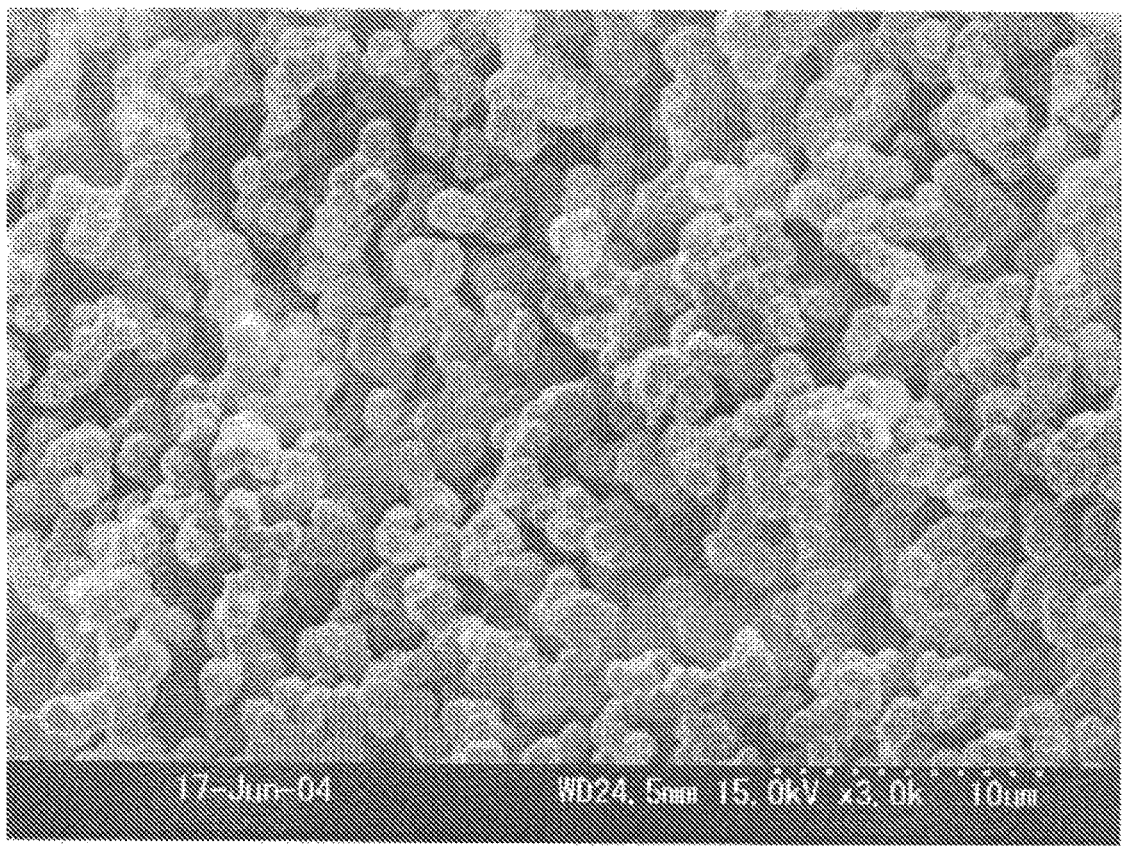
FIG. 3 shows a cross-sectional SEM photograph of the GDMA gel produced in Example 3.

Then, the above-mentioned stored GDMA solution was charged into the capillary coil by using a syringe pump (Harvard Apparatus Model 11) at a room temperature. After that, the both ends of the capillary coil were immediately sealed with a parafilm. Then, the polymerization was carried out in a water bath set at 60° C. for 24 hours. The polymerization of a monitoring sample in the test tube was simultaneously carried out in the same water bath in the same manner as in Example 1. The filled capillary coil was cut into 40 cm long pieces, and sequentially washed by using a liquid chromatography pump with tetrahydrofuran (THF) and 100% methanol for 24 hours. The monitoring sample was immersed in THF and dried in the same manner as in Example 1. The mesopores and the macropores of the dried sample was measured in the same manner as in Example 1, and the proportion of the specific surface area of the macropores to the specific surface area of all pores was calculated from the measurement results. The results are shown in Table 1. The dried monitoring sample was vapor-deposited with gold, and its morphology was observed by a scanning electron microscope SEM (Hitachi S-3000 N) at 3,000-fold magnification. As a result, a regular continuous structure was observed as shown in FIG. 3.

Example 4

A GDMA filled capillary (internal diameter 200 μm, length 42 cm) was prepared in the same manner as in Example 3.

Comparative Example 1

A GDMA filled capillary (internal diameter 200 μm, length 40 cm) was prepared in the same manner as in Example 3 except that a polymer porogen was prepared in the same manner as in Example 1 using a low molecular weight monodisperse polystyrene (Mw=50,000, Mw/Mn=1.04, Tosoh). The polymerization of a monitoring sample in the test tube was simultaneously carried out in the same water bath in the same manner as in Example 1. As a result, the test tube was filled up to a height of 4 cm from its bottom with a white solid.

Comparative Example 2

Figure 4:
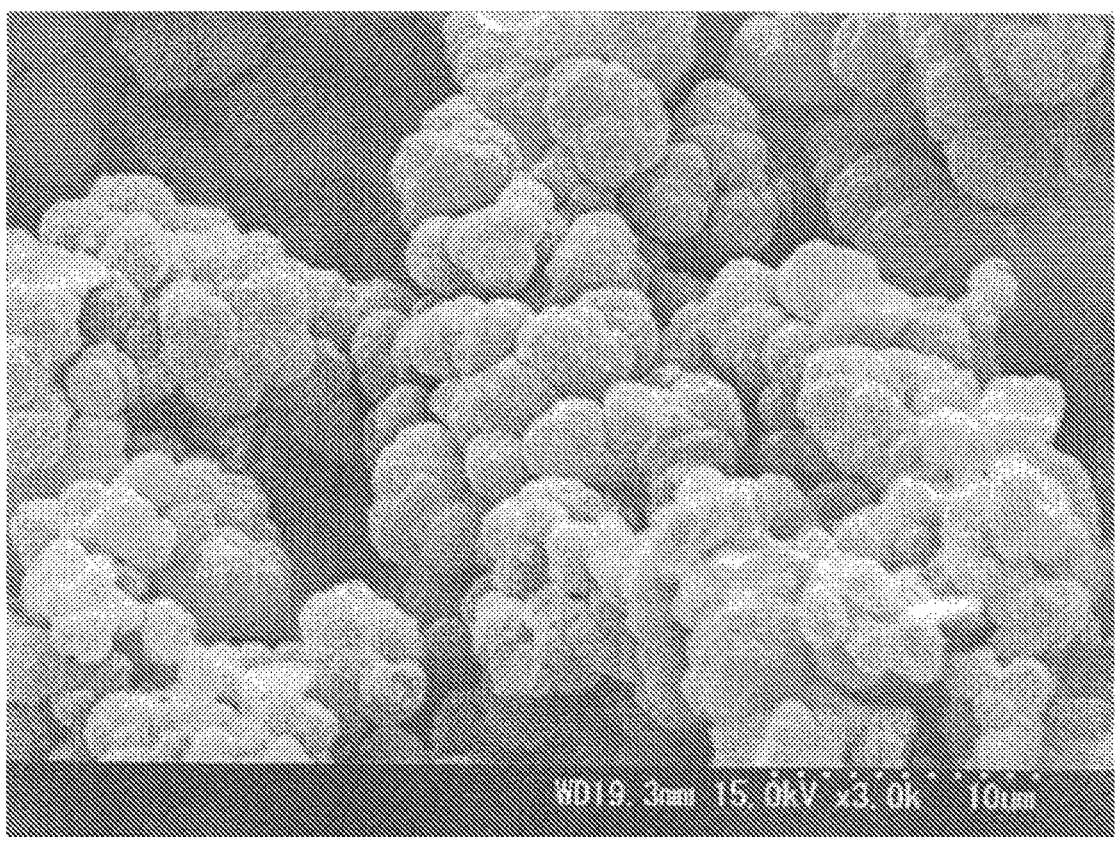
FIG. 4 shows a cross-sectional SEM photograph of the GDMA filled capillary produced in Comparative Example 2.
Figure 5:
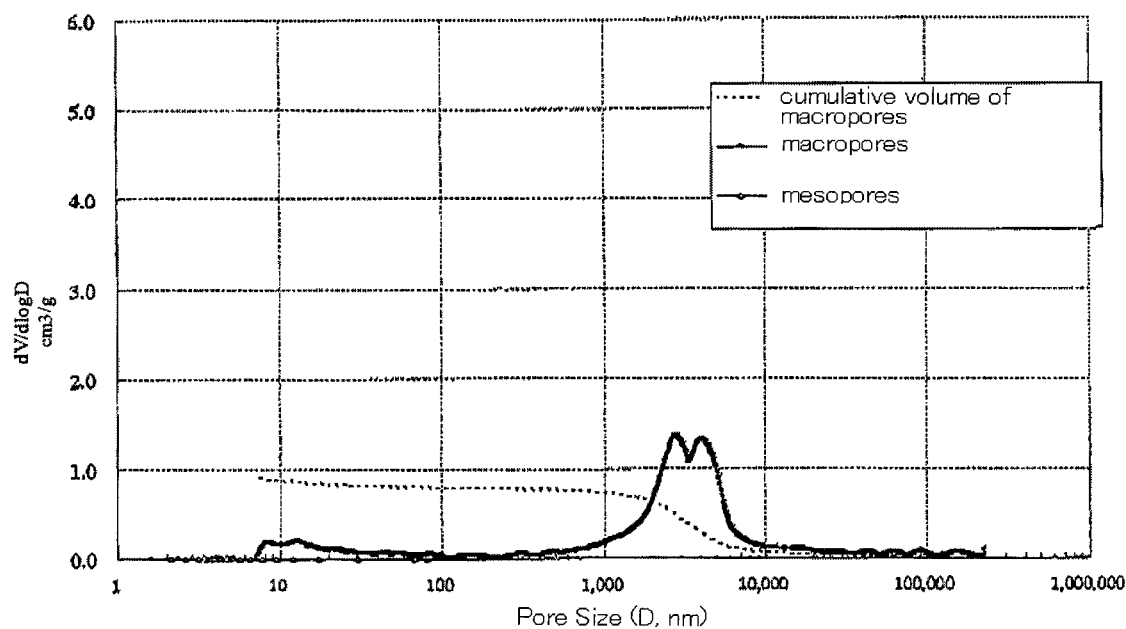
FIG. 5 shows the pore size distribution of the GDMA gel produced in Comparative Example 2.

A GDMA filled capillary (internal diameter 250 μm, length 40 cm) was prepared in the same manner as in Example 3 except that toluene (distilled product, solubility parameter 18.2 MPa$^{1/2}$, χ about 0.57) was used as a porogen. The polymerization of a monitoring sample in the test tube was simultaneously carried out in the same water bath in the same manner as in Example 1. The test tube was filled up to a height of 4 cm from its bottom with a white solid. The mesopores and the macropores of the dried sample was measured in the same manner as in Example 1, and the proportion of the specific surface area of the macropores to the specific surface area of all pores was calculated from the measurement results. The results are shown in Table 1. The pore size distribution ranging from mesopores to macropores is shown in FIG. 5. The peak of the mesopore distribution was extremely small and was slightly detectable in the vicinity of from 2 to 10 nm. As the macropore distribution, a very wide range of pore size distribution having a size of 1 decade in a range of from 1,000 nm to 10,000 nm and having a bimodal peak located at 300 nm and 400 nm was observed. Thereby, it is suggested that macro through pores have a poor regularity. The observation of the capillary cross-section by SEM showed a structure composed of agglutinated particles having a size of several micrometers (FIG. 4).

Comparative Example 3

A GDMA filled capillary (internal diameter 200 μm, length 12.5 cm) was prepared in the same manner as in Example 3 except that chlorobenzene was used only as a porogen.

TABLE 1

| sample | monomer (35 vol %) | porogen (65 vol %) | specific surface area of mesopores (m$^2$/g) | specific surface area of macropores (m$^2$/g) | proportion (%) of specific surface area of macropores |
|---|---|---|---|---|---|
| Ex. 1 | GDMA | chlorobenzene + 30 mg/ml polystyrene (Mw = 3,840,000; Mw/Mn = 1.04) | 73.21 | 69.67 | 48.76 |
| Ex. 2 | EDMA | same as above | 173.99 | 92.59 | 34.73 |
| Ex. 3 | GDMA | chlorobenzene + 30 mg/ml polystyrene (Mw = 3,840,000; Mw/Mn = 1.04) | 8.91 | 84.53 | 90.47 |
| Com. Ex. 2 | GDMA | toluene | 4.039 | 36.50 | 90.04 |

Note:
1. The specific surface area of mesopores was measured by a BET method and that of macropores was measured by a mercury intrusion method.
2. Monomer/porogen = 35/65%(v/v)
3. GDMA: glycerol dimethacrylate, EDMA: ethylene dimethacrylate Experimental Example 1

(Relationship of Flow Rate and Back Pressure)

The filled capillary having a cut length of 40 cm produced in Example 3 was connected to a direct-flowing to capillary type micro HPLC (high performance liquid chromatography) system equipped with a nano pump (Dina-S, KYA technology, range of flow rate: 1 to 100,000 nl/min) and a UV detector (JASCO, CE-2075 plus, detection wavelength 210 nm) and evaluated. As a mobile phase, 60% methanol/water (60/40, v/v) was used. The measurement was carried out at a room temperature. The capillary produced in Comparative Example 1 was evaluated by the micro HPLC apparatus in the same manner.

Figure 6:
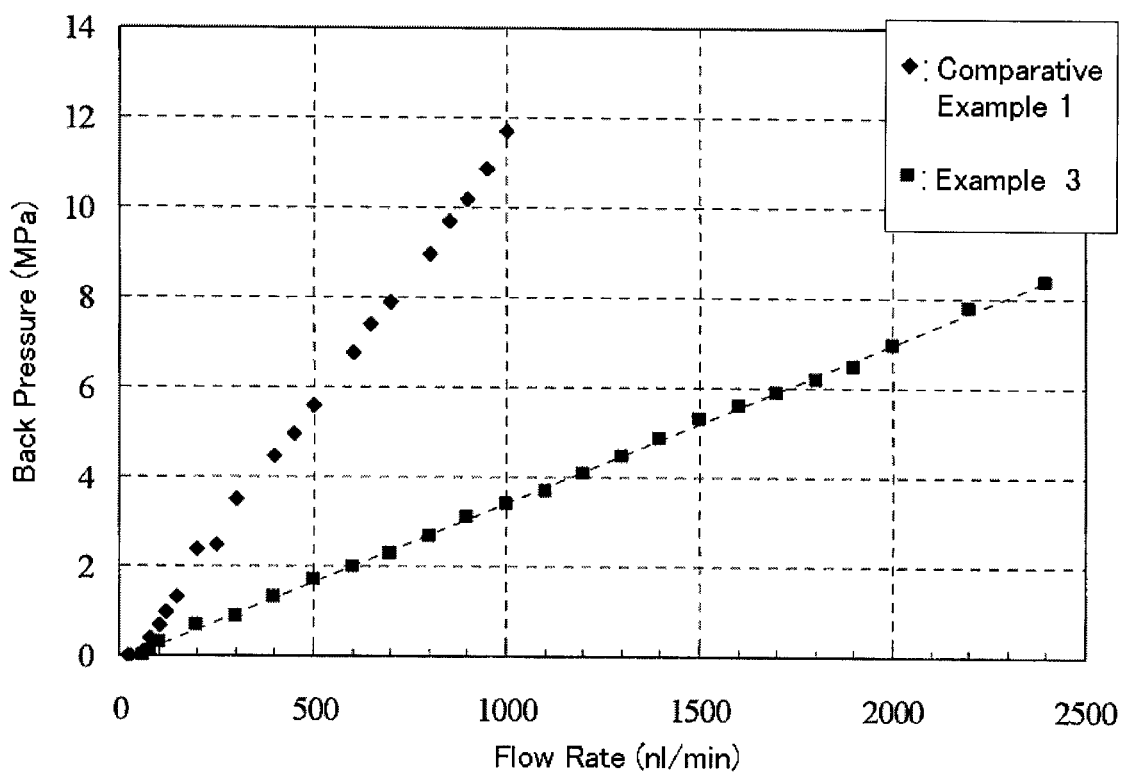
FIG. 6 shows relationships between a cross-sectional flow rate of mobile phase (methanol/water=60/40 (v/v)) and a back pressure at a room temperature in the GDMA filled capillaries produced in Example 3 and Comparative Example 1.

The flow rate and the back pressure of the capillaries were measured and determined the relationship between them. As a result, in the case of the capillary of Example 3, a complete linear relationship between the flow rate and the back pressure was observed (FIG. 6). In the case of the capillary of Comparative Example 1, an almost linear relationship between the flow rate and the back pressure was observed, but the back pressure in the same flow rate was about 3 times higher than in the case of Example 3 (FIG. 6).

From the above-mentioned fact, it is considered that the flow efficiency of a mobile phase of the capillary of Example 3 is substantially higher than that of Comparative Example 1, namely that the capillary of Example 3 has more suitable permeability for flowing a mobile phase than that of Comparative Example 1. Taking also the result of the above-mentioned SEM observation into account, it is considered that this is due to the formation of through pores (macropores) which have a small flow resistance and are regularly arranged in the flow direction of the capillary of Example 3.

Experimental Example 2

(Chromatogram of Benzene)

Figure 7:
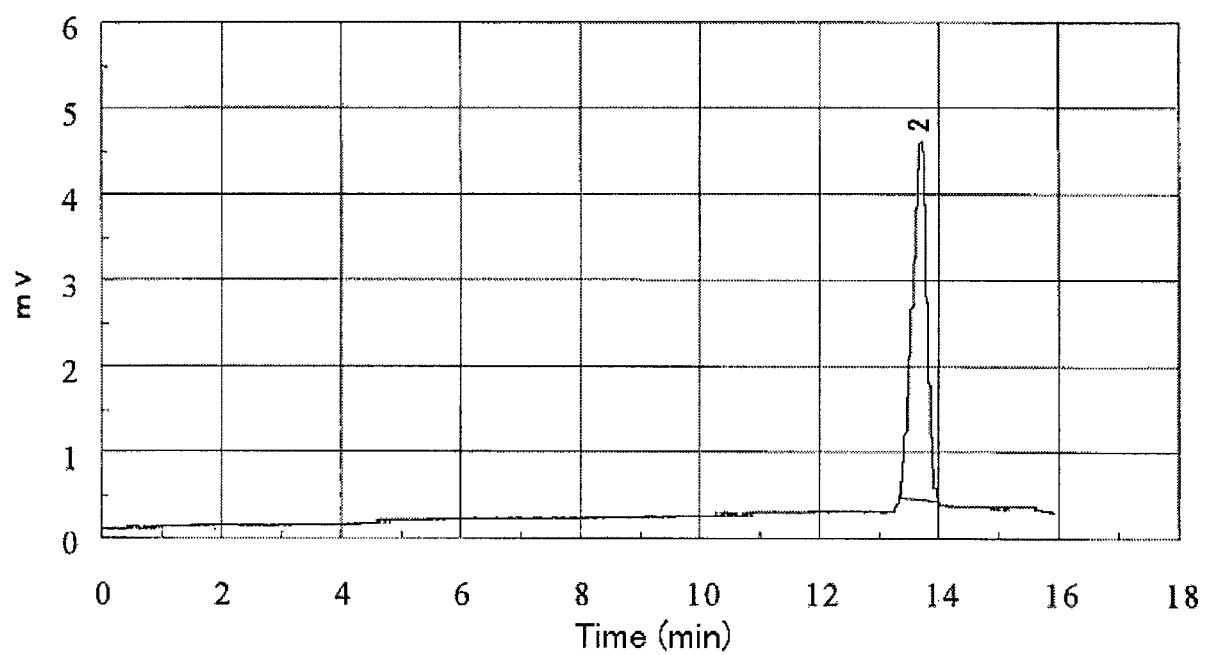
FIG. 7 shows a chromatogram for benzene by the GDMA filled capillary produced in Example 3.

The capillaries of Example 3 and Comparative Example 1 were connected to the same HPLC (high performance liquid chromatography) system as in the Experimental Example 1, and a solute chromatogram was measured by using benzene as a solute (concentration 1 mg/ml). As a result, in the case of the capillary of Example 3, a chromatogram showing a sharp peak having a peak asymmetry of 0.83, a retention time of 13.7 minutes and a theoretical plate number of 15,233 at a flow rate of 800 nl/min and a back pressure of 3.0 MPa was obtained (FIG. 7). In the case of the capillary of Comparative Example 1, a chromatogram showing a peak having a peak asymmetry of 1.10, a retention time of 13.32 minutes and a theoretical plate number of 1,646 at a flow rate of 800 nl/min and a back pressure of 9.0 MPa was obtained.

The capillary produced in Comparative Example 2 was connected to a common type HPLC detector (JASCO CE 1575 A, detection wavelength 210 nm), and a chromatogram of benzene was measured by using a split method, wherein a pump flow rate was split into a 1/1000 flow with a restrictor, in the same manner as described above. This condition is the same as the above-mentioned condition for the capillaries of Example 3 and Comparative Example 1. As a result, a chromatogram showing a peak having a peak asymmetry of 1.13, a retention time of 25.9 minutes and a theoretical plate number of 864 at a flow rate of 0.8 ml/min and a back pressure of 6.0 MPa was obtained.

In view of the results of the above-mentioned SEM observation and the above-mentioned rheogram, it is considered that a large number of pores (macropores) having a small coefficient of labyrinth was formed in the flow direction of the capillary of Example 3, and thereby a high theoretical plate number was obtained in the capillary.

Experimental Example 3

(Permeability)

Each of the capillaries of Example 3 and Comparative Examples 1 and 2 was connected to the same HPLC system as in the Experimental Example 1, and the permeability was estimated by using 60% methanol/water (60/40, v/v) as a mobile phase. The results are shown in Table 2.

TABLE 2

| Comparative Example 2 | | | Comparative Example 1 | | | Example 3 | | |
|---|---|---|---|---|---|---|---|---|
| flow rate (nl/min) | back pressure (MPa) | permeability ($m^2$) | flow rate (nl/min) | back pressure (MPa) | permeability ($m^2$) | flow rate (nl/min) | back pressure (MPa) | permeability ($m^2$) |
| 600 | 3.7 | $4.82 \times 10^{-14}$ | 80 | 0.4 | $5.94 \times 10^{-14}$ | 80 | 0.1 | $2.38 \times 10^{-13}$ |
| 800 | 5.2 | $4.57 \times 10^{-14}$ | 100 | 0.7 | $4.25 \times 10^{-14}$ | 100 | 0.3 | $9.91 \times 10^{-14}$ |
| 1000 | 6.5 | $4.57 \times 10^{-14}$ | 120 | 1.0 | $3.57 \times 10^{-14}$ | 200 | 0.7 | $8.49 \times 10^{-14}$ |
| 1200 | 7.7 | $4.63 \times 10^{-14}$ | 150 | 1.3 | $3.43 \times 10^{-14}$ | 300 | 0.9 | $9.91 \times 10^{-14}$ |
| 1400 | 9.1 | $4.57 \times 10^{-14}$ | 200 | 2.4 | $2.48 \times 10^{-14}$ | 400 | 1.3 | $9.15 \times 10^{-14}$ |
| 1600 | 10.5 | $4.53 \times 10^{-14}$ | 250 | 2.5 | $2.97 \times 10^{-14}$ | 500 | 1.7 | $8.74 \times 10^{-14}$ |
| 1800 | 11.7 | $4.57 \times 10^{-14}$ | 300 | 3.5 | $2.55 \times 10^{-14}$ | 600 | 2 | $8.92 \times 10^{-14}$ |
| | | | 400 | 4.5 | $2.64 \times 10^{-14}$ | 700 | 2.3 | $9.05 \times 10^{-1}$ |
| | | | 450 | 5.0 | $2.68 \times 10^{-14}$ | 800 | 2.7 | $8.81 \times 10^{-14}$ |
| | | | 500 | 5.6 | $2.65 \times 10^{-14}$ | 900 | 3.1 | $8.63 \times 10^{-14}$ |
| | | | 600 | 6.8 | $2.62 \times 10^{-14}$ | 1000 | 3.4 | $8.74 \times 10^{-14}$ |
| | | | 650 | 7.4 | $2.61 \times 10^{-14}$ | 1100 | 3.7 | $8.84 \times 10^{-14}$ |
| | | | 700 | 7.9 | $2.63 \times 10^{-14}$ | 1200 | 4.1 | $8.7 \times 10^{-14}$ |
| | | | 800 | 9.0 | $2.64 \times 10^{-14}$ | 1300 | 4.5 | $8.59 \times 10^{-14}$ |
| | | | 850 | 9.7 | $2.60 \times 10^{-14}$ | 1400 | 4.9 | $8.49 \times 10^{-14}$ |
| | | | 900 | 10.2 | $2.62 \times 10^{-14}$ | 1500 | 5.3 | $8.41 \times 10^{-14}$ |
| | | | 950 | 10.9 | $2.59 \times 10^{-14}$ | 1600 | 5.6 | $8.49 \times 10^{-14}$ |
| | | | 1000 | 11.7 | $2.54 \times 10^{-14}$ | 1700 | 5.9 | $8.56 \times 10^{-14}$ |
| | | | | | | 1800 | 6.2 | $8.63 \times 10^{-14}$ |
| | | | | | | 1900 | 6.5 | $8.69 \times 10^{-14}$ |
| | | | | | | 2000 | 7 | $8.49 \times 10^{-14}$ |
| | | | | | | 2200 | 7.8 | $8.38 \times 10^{-14}$ |
| | | | | | | 2400 | 8.4 | $8.49 \times 10^{-14}$ |

Each of the capillaries of Example 4 and Comparative Example 3 was connected to the same HPLC system as in the Experimental Example 1, and the permeability was estimated by using acetonitrile/water (60/40, v/v) as a mobile phase. The results are shown in Table 3.

TABLE 3

| Comparative Example 3 | | | Example 4 | | |
|---|---|---|---|---|---|
| flow rate (nl/min) | back pressure (MPa) | permeability ($m^2$) | flow rate (nl/min) | back pressure (MPa) | permeability ($m^2$) |
| 20 | 1.7 | $1.11 \times 10^{-15}$ | 500 | 0.5 | $2.24 \times 10^{-13}$ |
| 50 | 3.1 | $1.52 \times 10^{-15}$ | 600 | 0.7 | $1.92 \times 10^{-13}$ |
| 100 | 5.1 | $1.85 \times 10^{-15}$ | 700 | 0.8 | $1.96 \times 10^{-13}$ |
| 150 | 6.1 | $2.32 \times 10^{-15}$ | 800 | 1.0 | $1.79 \times 10^{-13}$ |

TABLE 3-continued

| Comparative Example 3 | | | Example 4 | | |
|---|---|---|---|---|---|
| flow rate (nl/min) | back pressure (MPa) | permeability ($m^2$) | flow rate (nl/min) | back pressure (MPa) | permeability ($m^2$) |
| 200 | 7 | $2.69 \times 10^{-15}$ | 900 | 1.1 | $1.83 \times 10^{-13}$ |
| 250 | 8.9 | $2.65 \times 10^{-15}$ | 1000 | 1.3 | $1.72 \times 10^{-13}$ |
| 300 | 10.3 | $2.74 \times 10^{-15}$ | 1200 | 1.7 | $1.58 \times 10^{-13}$ |
| 340 | 10.9 | $2.94 \times 10^{-15}$ | 1400 | 2.1 | $1.49 \times 10^{-13}$ |
| 350 | 11.6 | $2.84 \times 10^{-15}$ | 1600 | 2.4 | $1.49 \times 10^{-13}$ |
| | | | 1800 | 2.8 | $1.44 \times 10^{-13}$ |
| | | | 2000 | 3.1 | $1.44 \times 10^{-13}$ |
| | | | 2200 | 3.5 | $1.41 \times 10^{-13}$ |
| | | | 2400 | 3.8 | $1.41 \times 10^{-13}$ |
| | | | 2600 | 4.2 | $1.38 \times 10^{-13}$ |
| | | | 2800 | 4.5 | $1.39 \times 10^{-13}$ |
| | | | 3000 | 4.8 | $1.40 \times 10^{-13}$ |
| | | | 3200 | 5.2 | $1.38 \times 10^{-13}$ |
| | | | 3400 | 5.5 | $1.38 \times 10^{-13}$ |
| | | | 3600 | 5.8 | $1.39 \times 10^{-13}$ |
| | | | 3800 | 6.3 | $1.35 \times 10^{-13}$ |
| | | | 4000 | 6.6 | $1.36 \times 10^{-13}$ |

As described above, the permeability of the capillaries of Examples were apparently higher than those of Comparative Examples. In particular, the permeability of capillary of Example 4 was 2 orders of magnitude higher than that of Comparative Example 3. The back pressure of the capillary of Example 4 was significantly reduced compared to that of Comparative Example 3.

Example 5

A polymerization solution of GDMA was prepared in the same manner as in Example 1 except that 3 ml of chlorobenzene was used, 60 mg of an ultrahigh molecular weight polystyrene was used, and 10.8 mg of 2,2'-azobis(2,4-dimethyl) valeronitrile was used instead of 2,2'-azobisisobutyronitrile. This polymerization solution was filled in a UV transparent silica capillary (internal diameter 100 μm, length 14 cm; GL Sciences, product name: Fused Silica Capillary Tube (UV transparent film-coated tube)) in the same manner as in Example 3. Then, the photopolymerization was carried out by exposing the UV transparent silica capillary filled with the polymerization solution of GDMA to UV radiation by using a UV lamp (AS ONE, ultraviolet ray wavelength: 365 m, discharge tube power: 8 W×4, illumination power: 1820 μW/cm²) at a distance of 50 mm from the light source for 2 hours under a temperature condition of 25° C. to give a GDMA filled capillary (Example 5-1). The GDMA filled capillary (internal diameter 100 μm, length 44 cm) was produced by the thermal polymerization of the polymerization solution of GDMA in the same manner as in Example 3 (Example 5-2).

Figure 8:
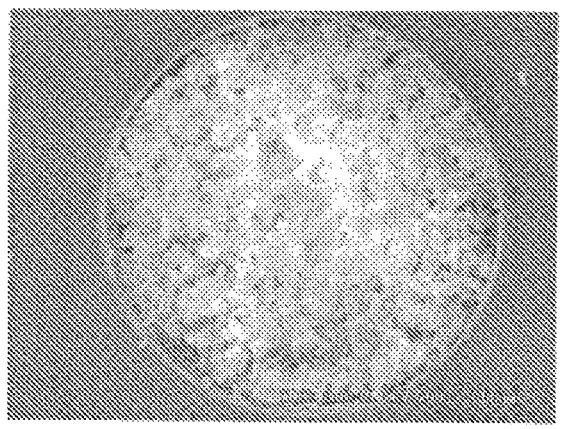
FIG. 8 shows cross-sectional SEM photographs of the GDMA filled capillaries (thermal polymerization and photopolymerization) produced in Example 5.
Figure 8:
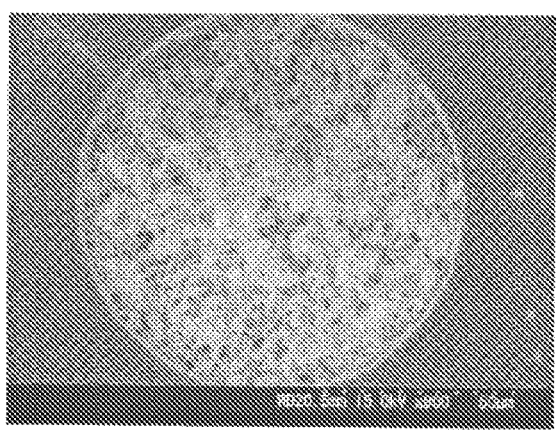
Figure 8:
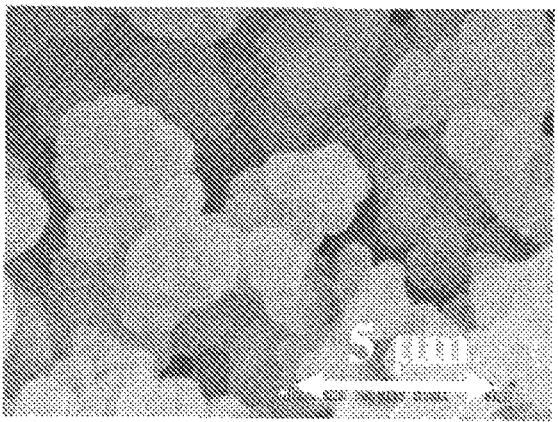
Figure 8:
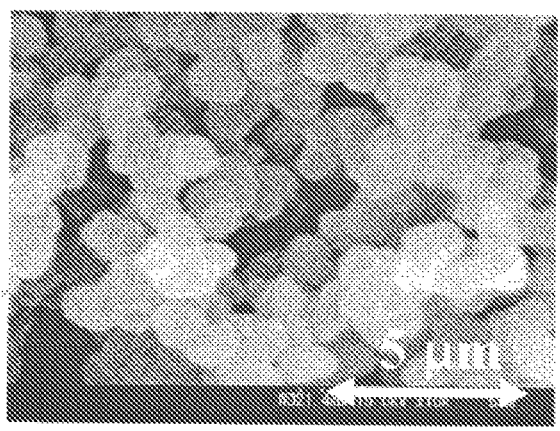

From the SEM observation of the cross-section of each of the resultant GDMA filled capillaries, it was found that the photopolymerization sample (5-1) has a more precise and uniform structure than that of the thermal polymerization sample (5-2) (FIG. 8). Therefore, it is considered that the pore size distribution of the photopolymerization sample (5-1) has a sharper peak than that of the thermal polymerization sample (5-2).

Experimental Example 4

Each of the two GDMA filled capillaries obtained in Example 5 (Example 5-1: photopolymerization and Example 5-2: thermal polymerization) was connected to the same HPLC system as in the Experimental Example 1, and a chromatogram was measured by using uracil as a solute (1 mg/ml concentration) and 60% acetonitrile/water (60/40, v/v) as a mobile phase, and then a relationship between the height equivalent to a theoretical plate (H; μm) and the linear velocity (u; mm/sec) was plotted (H-u plot). The result is shown in FIG. 9.

Figure 9:
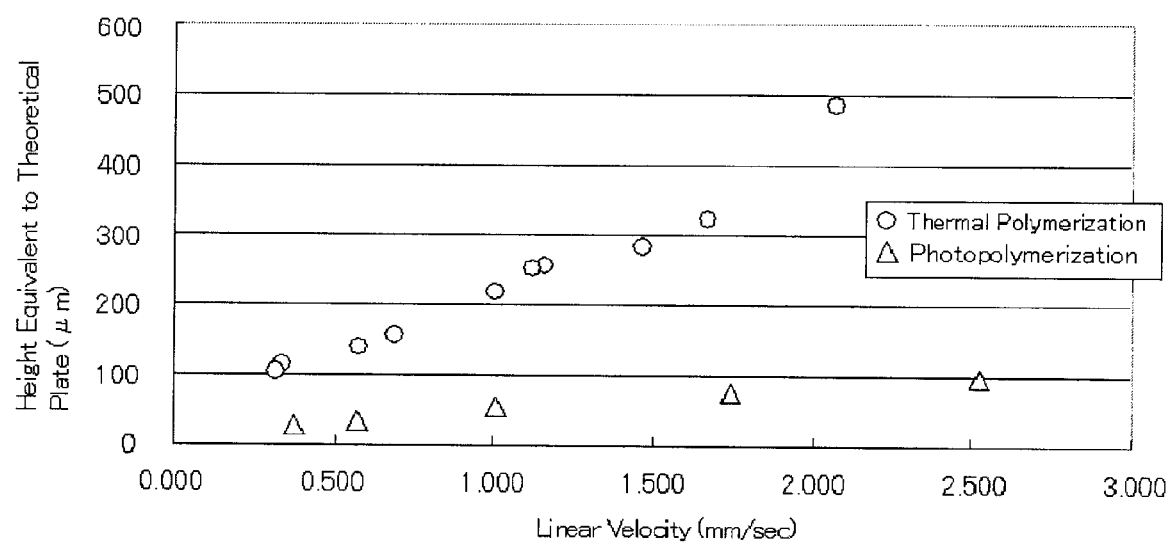
FIG. 9 shows a relationship (H-u plot) of a height equivalent to a theoretical plate and a linear velocity in a chromatogram for uracil by the GDMA filled capillary produced in Example 5.

As shown in FIG. 9, the height equivalent to a theoretical plate of the GDMA filled capillary obtained by the photopolymerization (Example 5-1) was extremely lower than that of the thermal polymerization (Example 5-2). It is considered that the extension of the solute band was restricted in the photopolymerization sample (5-1), since the photopolymerization sample (5-1) had a more precise and uniform structure than that of thermal polymerization sample (5-2). Therefore, the GEMA filled capillary obtained by the photopolymerization may be more useful for the simultaneous separation of a mixed sample containing many components, such as the separation of proteins, than that obtained by the thermal polymerization.

The invention claimed is:

1. A polymeric porous material wherein
   (a) the porous material has a bimodal pore size distribution attributable to macropores having a pore size within a range from 1 to 2 μm and mesopores having a pore size of from 2 nm to less than 50 nm,
   (b) the proportion of the specific surface area of the macropores to the specific surface area of all pores of the porous material is at least 10%,
   (c) the porous material has a uniform structure comprising a three-dimensional continuous network skeleton structure with pores of a regular bimodal pore size distribution with symmetrical peaks of mesopore and macropore size regions and a permeability suitable for flowing through a mobile phase liquid, wherein the pores are obtained by a phase separation via viscoelastic effect of a porogen solution, and
   (d) the porous material is produced by
      (1) polymerizing a monomer comprising at least one polyvinyl monomer in the presence of a polymerization initiator and a porogen solution forming mesopores and macropores by staged phase separation of the porogen solution, wherein the porogen solution is obtained by dissolving a polymer having a weight-average molecular weight of at least 100,000 and a molecular weight distribution Mw/Mn of not more than 1.5 in a good solvent for the monomer, wherein the good solvent for the monomer has an interaction parameter to the monomer of less than 0.5 at 25° C., and wherein the good solvent and the polymer act as a porogen, and
      (2) removing the porogen from the resultant product.

2. The polymeric porous material of claim 1, wherein the monomer comprises at least one crosslinkable monomer.

3. The polymeric porous material of claim 2, wherein the good solvent for the polymer has an interaction parameter to the good solvent for the monomer of less than 0.5 at 25° C.

4. The polymeric porous material of claim 1, wherein the polymer has an interaction parameter to the good solvent for the monomer of less than 0.5 at 25° C.

5. The polymeric porous material of claim 1, wherein the porous material has a permeability of at least $10^{-15}$ $m^2$.

6. The polymeric porous material of claim 5, wherein the polymer has an interaction parameter to the good solvent for the monomer of less than 0.5 at 25° C.

7. A process for producing the polymeric porous material of claim 1, which method comprises the steps of:

(1) polymerizing a monomer in the presence of a polymerization initiator and a porogen solution that is obtained by dissolving a polymer having a weight-average molecular weight of at least 100,000 and a molecular weight distribution Mw/Mn of not more than 1.5 in a good solvent for the monomer, wherein the solvent and the polymer act as a porogen, (2) phase separating the porogen solution by a viscoelastic effect to form a three-dimensional continuous network skeleton structure, and (3) removing the porogen from the resultant product.

8. A polymeric separation medium for filling a liquid chromatography column, wherein the polymeric separation medium comprises the polymeric porous material of claim 1.

9. A liquid chromatography column filled with the separation medium of claim 8, wherein at least one part of the separation medium crosses the entire longitudinal cross-section of the liquid chromatography column.

10. A polymeric separation medium for filling a liquid chromatography column, wherein the polymeric separation medium comprises the polymeric porous material of claim 2.

11. A liquid chromatography column filled with the separation medium of claim 10, wherein at least one part of the separation medium crosses the entire longitudinal cross-section of the liquid chromatography column.

12. A polymeric separation medium for filling a liquid chromatography column, wherein the polymeric separation medium comprises the polymeric porous material of claim 3.

13. A liquid chromatography column filled with the separation medium of claim 12, wherein at least one part of the separation medium crosses the entire longitudinal cross-section of the liquid chromatography column.

14. A polymeric separation medium for filling a liquid chromatography column, wherein the polymeric separation medium comprises the polymeric porous material of claim 4.

15. A liquid chromatography column filled with the separation medium of claim 14, wherein at least one part of the separation medium crosses the entire longitudinal cross-section of the liquid chromatography column.

16. A polymeric separation medium for filling a liquid chromatography column, wherein the polymeric separation medium comprises the polymeric porous material of claim 5.

17. A liquid chromatography column filled with the separation medium of claim 16, wherein at least one part of the separation medium crosses the entire longitudinal cross-section of the liquid chromatography column.

18. A polymeric separation medium for filling a liquid chromatography column, wherein the polymeric separation medium comprises the polymeric porous material of claim 6.

19. A liquid chromatography column filled with the separation medium of claim 18, wherein at least one part of the separation medium crosses the entire longitudinal cross-section of the liquid chromatography column.

\* \* \* \* \*